United States Patent [19]
Sanchez

[11] Patent Number: 5,798,730
[45] Date of Patent: Aug. 25, 1998

[54] PULSE EDGE DETECTOR WITH WIDE DYNAMIC RANGE

[75] Inventor: Louis Armando Sanchez, Morgan Hill, Calif.

[73] Assignee: Litton Systems, Inc., San Jose, Calif.

[21] Appl. No.: 891,859

[22] Filed: Jul. 9, 1997

[51] Int. Cl.$^6$ .................................................. G01S 7/28
[52] U.S. Cl. ........................... 342/195; 342/115; 327/24
[58] Field of Search ............................ 342/89, 92, 99, 342/115, 137, 195, 204; 324/76.39, 76.77; 327/28, 21, 24

[56] References Cited

U.S. PATENT DOCUMENTS

| | | | |
|---|---|---|---|
| 4,527,080 | 7/1985 | Zweig | 307/510 |
| 4,630,218 | 12/1986 | Hurley | 364/481 |
| 5,084,669 | 1/1992 | Dent | 324/83 D |

FOREIGN PATENT DOCUMENTS

| | | |
|---|---|---|
| 359121511A | 7/1984 | Japan . |
| 402044258A | 2/1990 | Japan . |
| 404265686A | 9/1992 | Japan . |

*Primary Examiner*—John B. Sotomayor
*Attorney, Agent, or Firm*—Ronald M. Goldman; Robert F. Rotella

[57] ABSTRACT

A pulse detector achieves high accuracy over a wide dynamic range in providing accurately spaced pulse edge markers that allow measurement of pulse to pulse time intervals. Received input pulses are transformed to a Gaussian like waveform and a single cycle AC signal having a first polarity initial half cycle is derived therefrom, accomplished by subtracting the Gaussian like waveform from a delayed, but substantially time overlapping, copy of that waveform. Upon completion of that initial half cycle, a pulse edge marker is generated. By measuring the time between the pulse edge marker obtained from one inputted pulse and that of the next, a measurement of the pulse to pulse interval is achieved that is of one nanosecond in accuracy.

24 Claims, 4 Drawing Sheets

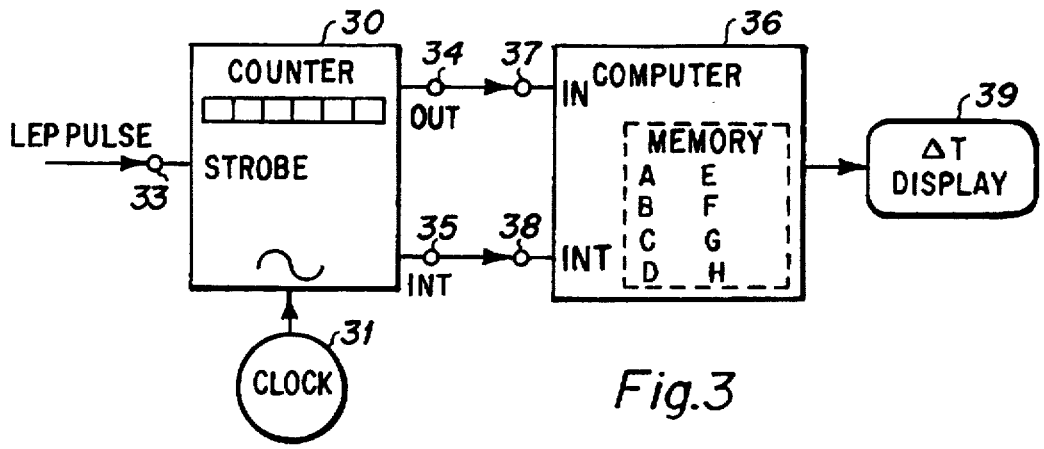
Fig.3
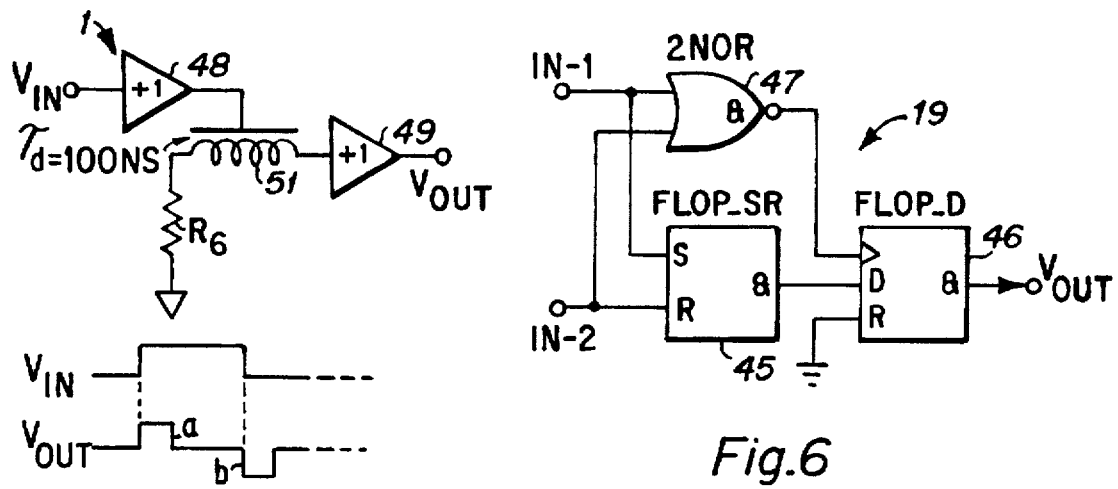
Fig.4
Fig.6
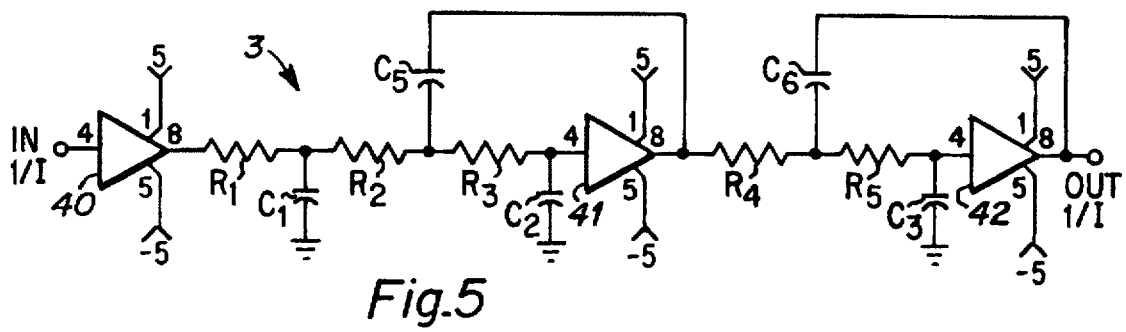
Fig.5

PULSE EDGE DETECTOR WITH WIDE DYNAMIC RANGE

FIELD OF THE INVENTION

This invention relates to electronic pulse detection circuits, and, more particularly to a circuit for detecting leading and/or trailing edges of electronic pulses within a received pulse train with great accuracy over a wide dynamic range.

BACKGROUND

Pulse detectors have been widely employed in radar systems and, in particular, in Doppler radar systems. In the latter type radar, a shift in frequency, the change in periodicity of reflected radar pulses, is a measure of the speed of movement of a radar reflecting object, such as an airplane. In operation of such radar systems, pulsed RF is transmitted in a regular series of pulses from an antenna, and propagates into space, essentially "looking" for a reflective object as might be encountered. Should the pulsed RF encounter a moving aircraft, some portion of the RF is reflected back to the radar system, wherein the reflected RF pulse is received, detected, demodulated and analyzed.

According to the known Doppler principles of physics, if the aircraft is moving toward the radar system, the frequency of the returned RF is shifted upward in frequency; if moving away, the returned frequency shifts downward. The returned pulses are inspected, as example, to determine the particular received frequency or, as alternately termed, the pulse repetition rate. The returned pulses, thus, are not the same properly tailored uniform pulses generated by the radar transmitter and emitted as a radar pulse, but are often changed.

To accurately measure that pulse repetition rate, it is necessary to accurately identify each pulse's leading edge and measure the interval between the respective leading edges of adjacent pulses. As further background on the format of pulses, consider that a digital pulse generator for electronic digital equipment produces a series or "train" of properly tailored voltage pulses, typically of rectangular shape. As viewed on an oscilloscope, each such pulse has a waveform, the shape of the instantaneous voltage level as a function of time, that contains a front or leading edge that steeply rises in level, almost instantaneously, from a base voltage, typically zero volts, to a maximum voltage level; continues at or near the maximum level for a certain duration, the pulse width; and a trailing edge wherein the voltage level falls to the earlier zero volt level and remains at that level for an interval, until the next like pulse in the train is generated.

Although being almost instantaneous and steep in slope, the pulse's leading edge requires a small, though finite, time duration to attain the maximum level, as may be more easily viewed on a higher time resolution scale on the oscilloscope. The same relationship holds true for the pulse's trailing edge. A digital pulse generator like the foregoing may serve as a separate piece of test equipment or may be present as an integral component circuit in the described radar system's RF generating and timing circuits.

To detect the pulse's leading and trailing edge's, modern radar systems may employ a threshold detector or a differentiator circuit. A threshold detector circuit produces a signal or output voltage at the instant of time that the level of the pulse's leading edge rises to a prescribed voltage level edge, the "threshold", during the pulse's excursion or rise to the maximum level. Alternately in the case of the trailing edge, the threshold detector produces a voltage at the instant of time the level of the pulse's trailing edge falls to a prescribed voltage level during the course of the trailing edge's fall to zero volts. The duration in time between the leading or trailing edge of one pulse and the respective leading or trailing edge of the next pulse in a pulse train is a measure of the periodicity of the pulse train. The time interval between the leading and trailing edge of a given pulse is the pulse's duration or width.

If the voltage pulses being supplied to the threshold detector are identical in amplitude and shape and are identically spaced from one another, such as produced by a high quality digital pulse generator, a threshold detector that is set to trigger its output when the leading edge of the pulse rises to ten volts, as example, produces an output at exactly the same position on the pulse's leading edge (or trailing edge as the case may be) as it produces for any other pulse in the pulse train. Since the same position is detected on adjacent pulses in the pulse train, the time duration between pulses is accurately characterized and measured.

The foregoing accuracy is maintained even if the frequency or, as otherwise termed, the pulse repetition rate of the pulses supplied by the pulse generator is increased or decreased. The time duration measured remains accurate, although changing, because the amplitude and wave shape of the pulse's leading edges in the pulse train is unchanged.

Present threshold detectors, however, do not attain the same level of accuracy when the amplitude and/or shape of the pulse's leading edge changes from one pulse to the next. Such a variation occurs in many practical applications, particularly the Doppler radar system earlier briefly described. There are many RF emitters in the environment, noise, which produce interfering signals returned with the reflected pulse that corrupts the amplitude and/or shape of the returned radar pulse. Further, the aircraft encountered may be moving in a pattern that changes the size of the airplane's reflecting surface exposed to the oncoming RF. This movement dynamically changes the amount of RF energy reflected back to the radar. A greater or lesser amount of RF energy may be reflected and the pulse amplitude changes accordingly.

For those reasons among others the pulses leading edge (and/or trailing edge as the case may be) may change amongst the various pulses in the received pulse train. If the threshold detector is set to trigger at 10 volts, as example, on one pulse in the train, which occurs 15 microseconds following the true start of the pulse, then on following pulse whose leading edge has a less steep slope, the threshold detector may not detect that voltage level until 17 microseconds following the start of the latter pulse. In effect the pulse to pulse time difference, a measure of frequency, may be in error by as much as two milliseconds from the correct or true duration.

For pulse detection application, threshold detectors are more accurate than differentiators. By applying the pulse train to a differentiator circuit, a series of voltage spikes would be attained at the differentiator circuit's output. By differentiating the pulse's leading edge, another voltage is obtained representative of the slope of that edge. However, as earlier described, that slope can also change with change in amplitude and waveform shape, providing an inconsistency in result. Briefly summarized, differentiators are subject to the same limitations of accuracy as the threshold detector.

Thus some measure of error is known to the designer and users of such radar systems, and effectively limits the resolution of the radar system. In applicant's experience a typical detection circuit is of 80 nanoseconds in accuracy, although it is believed that greater accuracies on the order of 40 to 50 nanoseconds have been achieved. No detectors known have heretofore achieved accuracy on the order of one nanosecond. As an advantage, the pulse detector of the present invention provides an accuracy of one nanosecond or better.

Accordingly, an object of the present invention is to improve the accuracy of measurement of the pulse to pulse interval of electronic pulses in a pulse train as well as the accuracy in measurement of pulse width.

A further object is to accurately detect with unparalleled accuracy the leading and/or trailing edges of electronic pulses whose characteristics may vary over a wide dynamic range.

A still further object is to provide a new electronic apparatus that is capable of replicating with an accuracy of one nanosecond or better the width of received electronic pulses whose characteristics may vary over a wide dynamic range and reproducing corresponding pulses of fixed amplitude.

And, an ancillary object of the invention is to provide a new electronic apparatus for providing electronic timing markers representing the leading and/or trailing edges of received electronic pulses.

SUMMARY OF THE INVENTION

In accordance with the foregoing objects, the circuit of the present invention inputs a train of electronic pulses and, with respect to each pulse, transforms the leading and trailing edge of the pulse to a a pair of smoothly rounded waveforms, a Gaussian like waveform. The derived Gaussian shaped waveform is of greater duration or width than the duration of the respecting leading and/or trailing pulse edges, though not as great as the pulse width. To define a time marker or representation for the leading edge, electronic means are included to transform each Gaussian like portion to a single cycle of a sinusoidal like waveform that is slightly greater in duration than its parent Gaussian waveform counterpart, but in which one half of that single cycle or "half cycle" is completed during the duration of the associated Gaussian like waveform from which derived. Additional electronic means are included to detect the completion of that half cycle and thereby define a point in time that is used to represent the pulse's leading edge. Additional like electronic means are included to represent the pulse's trailing edge in like manner. Effectively, the circuit is found to detect the leading and/or trailing edges of pulses with uncanny accuracy, despite dynamic changes in pulse amplitudes.

In one embodiment of the invention, the transformation of the leading and trailing edges of the received pulses to the Gaussian like waveform is obtained with a serial connection of a complementary high pass filter, which preserves the transient characteristics of the received pulse during filtering, and a low pass filter. The electronic means that produces the single cycle sinusoidal waveform is accomplished with a delay circuit, that slightly delays propagation of the Gaussian like waveform, and a difference amplifier, that subtracts the delayed waveform from an undelayed copy of the Gaussian waveform, to output the single cycle sinusoidal waveform.

As an additional feature to the invention, means are included to accept the representative leading and trailing edges so detected and produce a rectangular pulse of fixed amplitude. With such means the inputted pulses are replicated in duration and are of fixed amplitude, thereby providing a train of regular sized pulses that essentially clone the pulses originally produced at the radar transmitter. As an ancillary feature, the foregoing elements may also be incorporated within and define an improved pulse generator.

The foregoing and additional objects and advantages of the invention together with the structure characteristic thereof, which was only briefly summarized in the foregoing passages, becomes more apparent to those skilled in the art upon reading the detailed description of a preferred embodiment, which follows in this specification, taken together with the illustration thereof presented in the accompanying drawings.

BRIEF DESCRIPTION OF THE DRAWINGS

In the drawings:

FIG. 3 illustrates a time measuring apparatus used with the embodiment of FIG. 1;

FIG. 4 is a schematic of one type of complementary high pass filter as may be used for the high pass filter in the embodiment of FIG. 1;

FIG. 5 is a schematic of a five-pole Bessel low pass filter as may be used for the low pass filter in the embodiment of FIG. 1;

FIG. 6 is a schematic of one type of pulse generator as may be used for the pulse generator in the embodiment of FIG. 1;

DETAILED DESCRIPTION OF THE PREFERRED EMBODIMENTS

Figure 1:
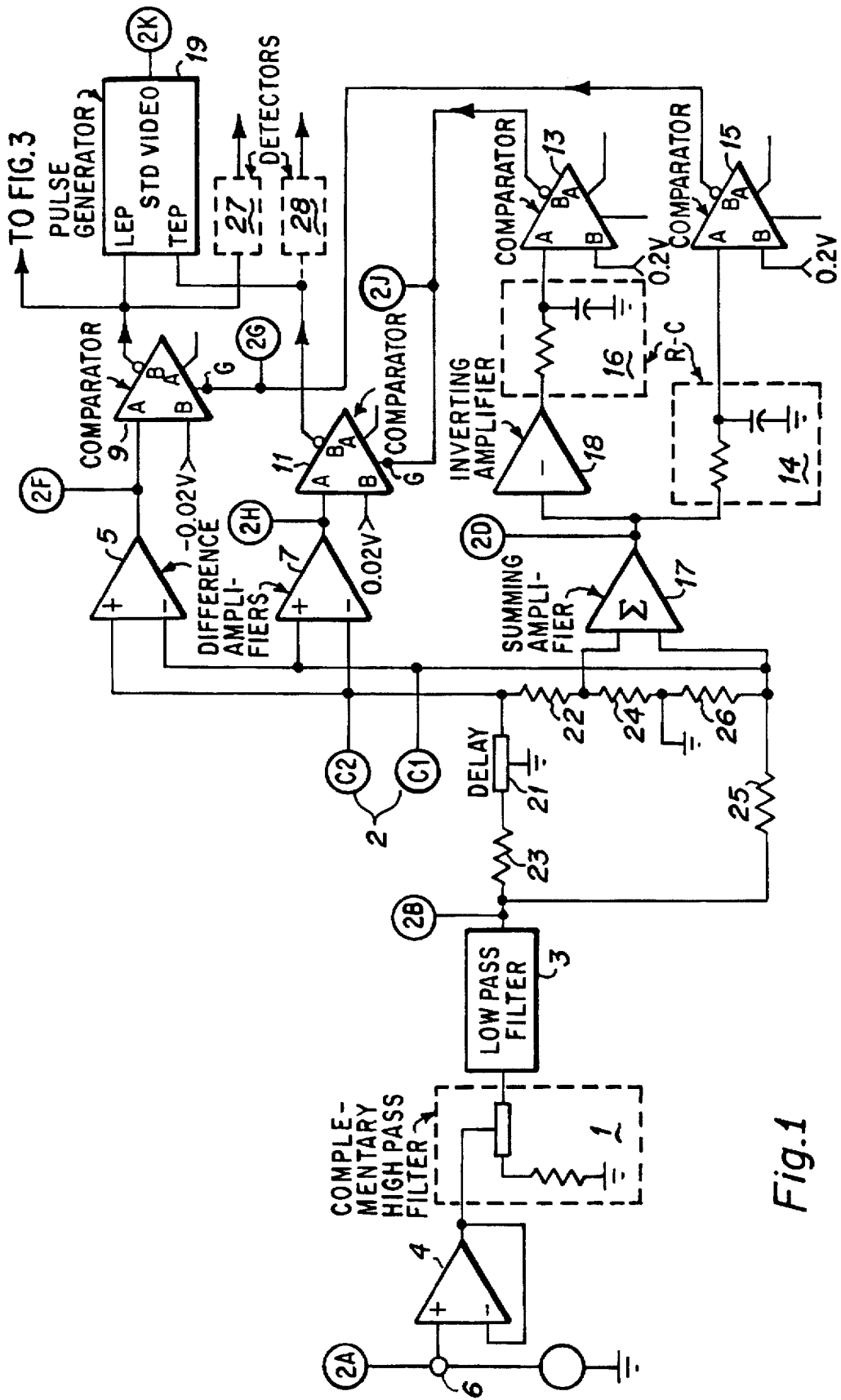
FIG. 1 illustrates an embodiment of the invention in block diagram form.

Reference is made to FIG. 1 which illustrates an embodiment of the invention in block diagram form. This embodiment includes a complementary high pass filter 1, a low pass filter 3, a buffer 4, difference amplifiers 5 and 7, comparators 9, 11, 13, and 15, summing amplifier 17, inverting amplifier 18, pulse generator 19, delay 21, resistors 22, 23, 24, 25 and 26, and, optionally, two small R-C smoothing circuits 14 and 16. To aid in understanding the invention, the waveforms that appear at various locations in the circuit of FIG. 1 during operation are presented in FIGS. 2a through 2k, and various circuit locations found in FIG. 1 are labeled with an encircled designation that references the corresponding figure where the waveform at that circuit location is illustrated.

In operation, a train of pulses whose pulse to pulse spacing one desires to determine or measure is applied to the circuit at input 6. Typically this pulse train may be a train of pulses that originates from a Doppler radar and originally constituted substantially identical generally rectangular shaped pulses evenly spaced in time, but which were reflected from a moving object, such as an aircraft, within the radar systems field of view. As a consequence of the reflection, those reflected pulses in the pulse train are predictably generally rectangular in shape, may no longer have identically shaped leading and trailing edges, and, more frequently, differs in amplitude, and the spacing between pulses is changed as a consequence of the Doppler shift occurring as a result of the aircraft's velocity of movement.

The received pulses pass through a buffer 4 and is input to a complementary high-pass filter 1, the latter suitably formed of a conventional delay line. The buffer electrically isolates the delay line from the drive source. The buffer presents a high impedance to the drive source, and a very low impedance to the delay line, thereby preventing the impedance characteristics of the delay line from being influenced by the impedance characteristics of the drive source. Complementary high pass filters, such as 1, have the characteristic of removing the lower frequencies, specifically the DC component of the pulse train, while preserving the transient properties of the applied pulses. The latter feature is important to the operation of the circuit.

The output from the high pass filter is applied to the input of a low pass filter 3. The low pass filter removes electronic noise from the pulse train and, in doing so, shapes the individual rectangular shaped pulses in the train, such as represented for one such pulse in FIG. 2a, smoothing or rounding those pulses to derive at the low pass filter's output two smoothly rounded pulses, one positive and one negative.

The latter pulses contain edges that are rounded, that is, pulses that have a shape that are Gaussian-like in shape, resembling the shape of a Gaussian curve, such as represented in FIG. 2b. As shown in FIG. 2b, the leading edge of the rectangular pulse is transformed to a Gaussian shaped positive voltage, portion b1, of a duration or width that is greater than the time taken by the inputted pulse to rise to its maximum voltage level, essentially the duration of the pulse's leading edge. The relatively constant amplitude portion is transformed to a flat zero voltage, curve portion b3. And the trailing edge of the pulse is transformed to a Gaussian shaped negative voltage, curve portion b2, of a duration or width that is greater than the time taken by the inputted pulse to fall to its minimum voltage level, essentially the duration of the pulse's trailing edge.

One suitable practical form for low pass filter 3 is the familiar five pole Bessel filter. That kind of filter has one of the best transient responses with minimal overshoot or ringing. The low pass filter is optimized to handle the narrowest pulses expected for examination, typically about 100 nanoseconds in duration. However, in extreme applications where even more narrow pulses are anticipated, then, ideally, the filter should be re-optimized.

Figure 2:
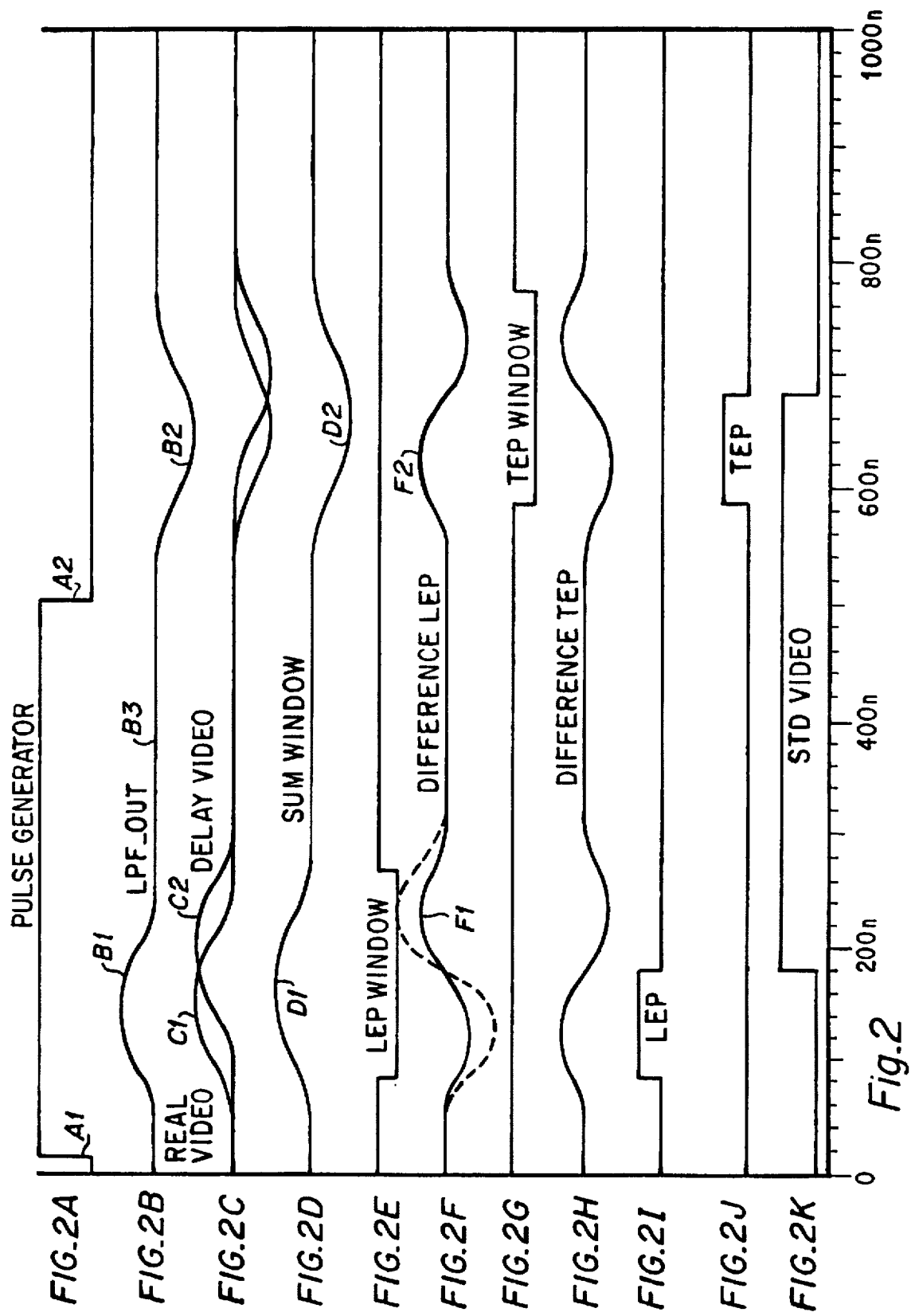
FIGS. 2a through 2k illustrates the various waveforms produced during operation of the foregoing embodiment.

It should be noted that FIG. 2 illustrates the waveforms appearing in the circuit during operation for one pulse and the following description describes operation with respect to that pulse and the next adjacent pulse in the pulse train. However, it is understood that the same operations are repeated during operation upon all other pulses in the inputted pulse train.

The output from low pass filter 3, containing the Gaussian like waveforms, is applied to a branching circuit and is divided between two branches, one of which includes a time delay circuit. The first branch leads through series connected resistors 25 and 26, which forms a voltage divider circuit, to electrical ground. The second branch leads through resistor 23, delay circuit 21, and through another voltage divider circuit of series connected resistors 22 and 24 to electrical ground.

The pulse propagation time through the two branches differs so that the pulse traveling through the second branch is delayed in time relative to the like pulse traveling through the first branch. Being entirely resistive there is insignificant delay in propagating through the first branch. The first branch thus reproduces the pulse's waveform, sometimes referred to as the "real" video or signal, which is represented as curve C1 in FIG. 2c. The second branch reproduces that same inputted waveform at the corresponding output, but is delayed in time, as represented in curve C2 in FIG. 2c, and is sometimes referred to as the "delay" signal or delayed copy of the signal. As revealed by inspection of those waveforms in FIG. 2c, the waveforms remain the same in shape as in FIG. 2b but are slightly displaced in time from one another.

A time delay selected for delay circuit 21 in the present embodiment is approximately 50 nanoseconds. The delay is empirically determined. Ideally, the delay represents a duration of about one-half of the duration of the positive Gaussian-like waveform in curve portion B1 of FIG. 2b anticipated to be derived from incoming pulses.

Both the real and delayed signals are then applied to a difference amplifier 5, which amplifies and outputs a difference signal, as illustrated in FIG. 2f. The negative, "−", and positive, "+", inputs of difference amplifier 5 are connected, respectively, to the output of the first branch at the juncture of resistors 25 and 26 and to the output of the second branch at the juncture between the end of delay circuit 21 and resistor 22. Difference amplifier 5 subtracts the voltage applied at its negative input from that voltage applied at its positive input, effectively subtracting the "delayed" waveform from the "real" waveform.

As illustrated in FIG. 2f, the subtraction transforms the input Gaussian shaped waveforms for the pulse to respective sinusoidally varying waveforms, each of which is of one cycle in duration. The first curve portion f1, corresponds to the leading edge transformation. The curve smoothly decreases to a minimum voltage, reverses in direction and smoothly increases positive, passing through the zero volt level as it completes one-half cycle. The curve increases further to a positive voltage maximum and then smoothly decreases again to the baseline or zero voltage at the conclusion of the next half cycle. This is seen as a sinusoidal waveform or, as variously termed, an AC waveform. Following the completion of the foregoing cycle, the output waveform remains flat for a duration until the waveform portion representing the trailing edge transformation is encountered at curve portion f2.

The trailing edge transformation is a like sinusoidal type waveform of one AC cycle in duration, but opposite in polarity to the previously described transformation. It's first half cycle is positive in polarity, whereas the first half cycle of the previous transform was negative in polarity. The waveform first smoothly increases in voltage to a maximum voltage and then decreases, passing through zero upon completing one-half cycle, and smoothly decreases to a minimum voltage, and then smoothly increases back to zero, upon the conclusion of the second half cycle. The circuit then awaits the next pulse to be input and transformed, and performs the same function. As becomes apparent from the further description of operation, this latter AC cycle is disregarded by this portion of circuit as it is not used for detecting the leading edge of the inputted pulse.

Considering the first such sinusoid f1 in FIG. 2f that is derived from the pulse's leading edge, the difference waveform is observed to progress through a first half-cycle within a period of time that is shorter than the width or duration of the underlying Gaussian shaped pulse, curve C1 in FIG. 2c, from which the sinusoid was derived. At the completion of that half-cycle, the waveform crosses the axis and is at zero volts. That is the point in time that is selected as representing the leading edge of the inputted pulse (FIG. 2a) in this invention.

Comparator 9 detects the point at which the initial half cycle of the first sinusoid in the difference waveform attains the zero volt level. The output of difference amplifier 5 is applied to the A input of comparator 9. The B input, with which the A input is compared, is biased to essentially zero volts or a slightly negative voltage very close to zero, such as −0.02 volts. The comparator also contains a gate input G, through which the comparator operation can be controlled or inhibited. For purposes of this point in the explanation of circuit operation for leading edge detection, that gate input is assumed to be properly biased by comparator 15, which is later herein described in greater detail.

When the difference signal applied at the A input is less than or equal to the bias voltage at the B input, the comparator switches its output state from a digital "low" to a "high". When that input signal rises in level to about zero volts, the comparator switches its output state back from "high" to "low". Since the difference waveform of F1 in FIG. 2f is in the initial negative half cycle, comparator 9 switches its output to high, such as illustrated in FIG. 2i, initiating generation of the pulse illustrated in FIG. 2i. When the first half cycle of the first sinusoid attains the same voltage level as the bias voltage at B, the −0.02 volts in the example given, or essentially zero volts, comparator 9 detects a "match" and immediately switches its output back from high to low, thereby forming the leading edge pulse ("LEP pulse") of FIG. 2i.

The trailing edge of the LEP pulse, the transition from high to low voltage, effectively marks the point in time at which the first half cycle of the difference waveform crosses the axis at zero volts, the point in time chosen to represent the input pulse's of FIG. 2a leading edge. This may be observed by extending a vertical line from the trailing edge of pulse LEP up through FIG. 2f. In practice, the latter point is actually slightly delayed due to the small propagation and switching delays inherent in the circuit, but that slight delay is insignificant, on the order of a few nano-seconds or so, and may be disregarded.

The output of comparator 9 is coupled to the time measurement apparatus of FIG. 3 and to one input of pulse generator 19, later herein discussed. Additionally, if a separate leading edge marker is desired, the comparator's output may also be connected to a detector 25, represented in dash lines, that detects the trailing edge of the LEP pulse and outputs a marker signal. As example such a detector 25 is suitably a negative slope triggered monostable multivibrator.

A like function is used to detect the input pulse's trailing edge. That detection is accomplished with difference amplifier 7 and comparator 11. The pulses trailing edge, A2 in FIG. 2a, was transformed by filters 1 and 3 to the negative Gaussian shape waveform illustrated in curve portion b2 in FIG. 2b. And that portion is branched at resistors 23 and 25. As before, one branch is essentially resistive and is without significant propagation delay to provide a "real" output at one end of resistor 25 and the other branch is delayed by delay circuit 21 and to provide the "delay" output at 21. Those two outputs are applied to the respective "positive" and "negative" inputs of difference amplifier 7. However, this time the "real" output, waveform C1 in FIG. 2c, is subtracted from the delayed output, waveform C2 in FIG. 2c, to obtain the difference signal, which is the single cycle sinusoid like waveform of FIG. 2h.

The single cycle of AC shown to the left in FIG. 2h, derived from the applied pulse's leading edge, A1 in FIG. 2a is applied to the A input of comparator 11, but has no effect and is essentially disregarded. This is so because comparator 13 does not yet supply a gating signal to the gate of comparator 11 and open its "window" as will be later herein described. The initial half cycle of the foregoing sinusoid is positive in polarity and its remaining half cycle is negative.

The difference signal also later produces an oppositely phased single cycle AC waveform shown to the right in FIG. 2h that is derived from the pulse's trailing edge A2 in FIG. 2a, which is the edge now sought to be marked. The initial half cycle of the latter is negative in voltage, just like the corresponding half cycle for the leading edge conversion shown to the left in FIG. 2f. This sinusoidal shaped difference signal is applied to the A input of comparator 11.

With its second input biased slightly negative, and, assuming its gate G properly biased, comparator 11 switches its output from low to high, commencing generation of the TEP pulse illustrated in FIG. 2k. The comparator remains in that High output state until it detects that its input at A has risen to the level at its bias input B, which occurs as the first half cycle of the sinusoid is completed, attaining the zero volt level represented at the chart axis. Detecting a match, the comparator switches from its high output to a low, terminating the TEP pulse. The transition from high to low, the trailing edge, of the TEP pulse marks the desired point in time. That point is taken as representing the trailing edge of the input pulse of FIG. 2a.

The output of comparator 11 is coupled to the time measurement apparatus of FIG. 3 and to a second input of pulse generator 19, later herein discussed. Additionally, if a separate trailing edge marker is desired, the comparator's output may also be connected to a detector 26, represented in dash lines, that detects the trailing edge of the TEP pulse and outputs a marker signal. As example such a detector 26 is suitably a negative slope triggered monostable multivibrator.

In the foregoing description, the respective gate inputs of comparators 9 and 11 were assumed to be properly biased, permitting the respective comparators to function in the manner earlier described to produce the pulse edge markers. As shown in FIG. 2f, the difference LEP waveform contains an interval of zero volts and contains a second sinusoid that also passes through a zero volt level. Since comparator 9 would switch from low to high and back or "chatter" during those intervals, creating false signals, it is necessary to prevent the comparator from functioning during the latter period. Accordingly, the comparator is gated to allow comparison operation only during the initial sinusoidal waveform. This creates a window, illustrated in FIG. 2e, that is of a width or duration that permits the comparator 9 to view or inspect only one of the two single cycle sinusoidal waveforms, the first sinusoidal waveform in FIG. 2f. For the same reason, comparator 11 should view or inspect only one of the two sinusoidal waveforms, the second sinusoidal waveform, illustrated in FIG. 2k.

Summing amplifier 17, inverting amplifier 18 and the associated comparators 13 and 15 function as a gating circuit to define two "windows" of time during which the leading pulse edge and/or trailing pulse edge may be detected by the respective comparators 9 and 11, preventing any false detections which might occur at intervals outside those windows.

The output of the real and delayed branches of the circuit are also applied to the two inputs of summing amplifier 17. One input is taken at the circuit juncture between resistors 25 and 26; the other is taken at the circuit juncture between resistors 22 and 24. Summing amplifier 17 sums the voltages at the two inputs, whose waveform shapes are like those illustrated in FIG. 2c, to produce at its output a waveform that represents the sum of the pulse waveforms at each branch. This output waveform is represented in FIG. 2d. Curve portion 1 in FIG. 2d represents the positive going voltage, representing the transformed leading edge of the input pulse of FIG. 2a, and Curve portion 2 in FIG. 2d represents the negative going voltage, representing the trailing edge of that input pulse. This sum waveform also contains Gaussian shaped portions and each of those portions are slightly greater in width than the corresponding portions that appeared at the output of low pass filter 3, illustrated in FIG. 2b.

The gating of the comparator for leading edge detection is considered first. The foregoing sum voltage is applied to the A input of comparator 15, directly or via resistor in R-C circuit 14 if the latter is included in the circuit.

At this point in the description brief note is made of the optional R-C circuits 14 and 16. In practical embodiments the summing amplifier and inverting amplifiers often incorporate operational amplifiers mounted on printed circuit boards. Should the capacitance inherent between the leads on the boards and the operational amplifier's inputs be large enough, the effect, as is known, could lead to instability of the amplifier. To counteract that stray capacitance, one practice is to incorporate a small R-C circuit coupled to the amplifier's output, such as a fifty one ohm resistance and a 33 PF capacitor, which forms a very small low pass filter. For like reasons R-C network 16 is coupled to the output of inverting amplifier 18. In practice thus, it may be found that the foregoing compensation is unnecessary, depending upon the particular amplifiers included in a practical implementation of the summing amplifier and inverting amplifiers. It is appreciated that R-C circuits 14 and 16 otherwise serve no function in the logical operation of the new circuit or to its theory.

Continuing, when the sum voltage at the A input exceeds the voltage at the comparator's second input B, which is biased with a small voltage, 0.2 volts as example, the comparator output drops from a voltage High to a Low, such as illustrated in FIG. 2e. The output remains low until the output of summing amplifier 17, that is, the sum voltage, falls to zero, at a later moment of time. Thereafter the comparator's output voltage returns to its normal High level. This relationship is illustrated by FIGS. 2d and 2e. Note that when the sum voltage falls below zero, as at the Gaussian portion labeled 2, comparator 15 cannot produce another window and essentially blanks out or blocks that portion of the waveform. Thus the control circuit provides an enabling LEP window in FIG. 2e that is greater in duration than necessary to enable comparator 9 to detect the LEP pulse, but not so wide as to extend in time beyond the end of the associated single AC cycle.

Note is made that inverting amplifier 18, and comparator 13 cannot function at this time, since the voltage applied to the input of amplifier 18 is of an incorrect polarity. The latter circuit elements are intended to define a window of time or TEP window only for the trailing edge of the pulse. A like effect occurs in connection with the sum voltage produced in respect of the pulse's trailing edge, but in this case inverting amplifier 18, the resistor in R-C smoothing circuit 16 and comparator 13 function to define the TEP window, illustrated in FIG. 2g. Since the output of summing circuit 17 is negative at that time, comparator 15 is biased non-conducting and cannot change its output.

Continuing, the output of comparator 15 is connected to the Gate input of comparator 9. During the time window defined by comparator 15, the output of the latter comparator properly biases or conditions comparator 9, enabling the comparator to switch from its "low" into its "high" output state, raising the output voltage, when the input at A exceeds the small bias voltage at B. This latter action was earlier described in connection with generation of the leading edge marker, and need not be here repeated. Once switched to its high output state, the comparator cannot switch back to its "normal" low state until the difference voltage applied at its input falls to zero during the difference voltage's cycle. As shown in FIG. 2i, accordingly a pulse of short duration is produced at comparator 9's output.

Pulse generator 19 detects the transition of that pulse's back edge, that is the transition from "high" to "low". This transition is the electronic peg, benchmark, signal or marker, as variously termed, that, by definition, is taken as the start or leading edge of the input pulse. As is apparent from comparing the oscillograph pattern of FIG. 2a with that of this benchmark of FIG. 2j, this benchmark is displaced in time, delayed, from the time position of the leading edge of the input voltage pulse, and, in that sense, the time marker produced is a simulation. However, the like marker that is produced in the foregoing manner by the next pulse in the pulse train is similarly delayed. Since the pulse repetition rate or frequency of the pulse train is determined from the time difference between the leading edge of one pulse in the pulse train and the leading edge of the next pulse in the train, $f=(1/t)\times c$, the delays cancel out, and the time difference between the two markers is an accurate representation or measure of the pulse to pulse timing interval.

To make a pulse to pulse time measurement using the information obtained from foregoing circuit, the LEP pulse is fed to an electronic counter that has an input circuit capable of detecting the "back end" of the LEP pulse, the transition from high voltage to low voltage, at which time the counter makes a reading. With subsequent pulses, the counter continues to take readings and the strobed output each time provides a number representing an instant of time. By taking multiple readings with that counter, different instances of time are represented. By subtracting one reading from the next the time interval between pulses "$\Delta T$" is obtained.

The foregoing is represented in the block diagram of FIG. 3 to which reference is made. In this figure electronic counter 30 is continuously driven at a high rate by clock 31. The counter contains a strobe pulse input 33 and a strobed digital output 34. When the counter receives a strobe pulse at the strobe input, the counter produces a digital number at its output that represents the point in time at which the voltage level of the applied strobe pulse changed from a high value to a low value. Here, the LEP pulse of FIG. 2i serves as the strobe pulse; and the afore described voltage transition represents the "back end" of the LEP pulse of FIG. 2i produced at comparator 9 in FIG. 1. Further, the counter produces a strobe output each time new digital information is presented at the counter's output.

A programmed high speed digital computer 36 receives digital information presented at the output of counter 30 at computer input 37 and an interrupt request at interrupt input 38. The computer is programmed to routinely periodically check its interrupt requests input to determine if digital information is being presented at input 37 for processing. When electronic counter 30 outputs digital time information at 34, it concurrently outputs an interrupt request at 35. Detecting the interrupt request, the computer checks input 37 for digital data and stores the digital data present at one location in memory. When the next interrupt request is received, the computer again receives digital time data and stores that new data in another location in memory; and continues this handling and storage of additional digital information received at the input in a chronological order in memory.

The computer is programmed to subtract, either concurrently or subsequent to acquisition of that data, the value of the subsequent data from the immediately preceding data to obtain a difference or subtrahend value. Since each of the digital values being subtracted represents time, each difference represents an interval of time.

The computer computes and stores a plurality of such time intervals in memory and stores them in order. The computer may output those values, in accordance with the program, to a display such as associated computer display 39, formatting the display to show a number of such values in consecutive order. If desired the computer can also be programmed to additionally translate the determined values into the corresponding frequencies and display the latter frequencies. It is appreciated that all of the described programming is rudimentary in nature and is easily accomplished by any skilled programmer.

As is appreciated by those skilled in the art, the same kind of pulse to pulse time measurement using the leading edge of the pulses can also be made by measuring the time difference between the trailing edge of one pulse and the trailing edge of the next pulse. However the leading edge is preferred for taking such time measurement.

Preferably a practical embodiment of the invention should desirably be shielded from electronic noise as could cause incorrect triggering of comparators 9 and 11. Low noise components are preferred as well.

It is appreciated that the circuit components illustrated in block form are known devices and many different specific implementations of those devices are available. The specific details of each component may thus vary. And some will require adjustment of component values to ensure that the component satisfies the described requirements in the combination as described. Although perhaps not necessary to an understanding of the invention, but by way of illustration and example, more specific illustration of the principal components are presented in the illustrations of FIGS. 4 through 7.

A more detailed schematic a preferred form of complementary high pass filter 1 is illustrated in FIG. 4. Those skilled in the art recognize the configuration as that of a passive delay line, which here serves as a filter. The circuit includes two operational amplifiers 48 and 49, suitably type CLC111AJE amplifiers, delay line 51, which provides a one-hundred nanosecond delay, and a resistor R6, suitably one-hundred ohms in value, attached to one arm of the delay line.

In operation, with a rectangular input pulse, Vin, applied to the input of operational amplifier 48, and from the amplifier's output is applied to the delay line input, where it propagates to the input of the output amplifier 49. At the output a pair of more narrow rectangular pulses, identical in width or duration, is produced, such as illustrated in the figure, one of which, a, is positive in polarity and the second, b, negative in polarity. The leading edge of pulse "a" is essentially coincident in with the positive going leading edge of the Vin pulse, and the leading edge of pulse "b" is essentially coincident with the trailing edge of the Vin pulse.

The bandwidth of complementary high pass filter 1 should be large enough so that it does not impose a bandwidth limitation on the signal channel. Limiting bandwidth is a function is intended for the low pass filter 3 in FIG. 2. It may be noted that, except for low pass filter 3, all of the components in the invention are preferably of a very wide band width characteristic. Therefore the bandwidth of the channel through which the input pulses propagate is effectively controlled by the bandwidth of the low pass filter. Preferably the bandwidth of the complementary high pass filter 1 should be made twice as great as one would normally use in a circuit. As example, it should have a delay to rise time ratio of 13 to 1.

A preferred form of low pass filter is a five-pole Bessel low pass filter illustrated schematically in greater detail in FIG. 5. The low pass filter includes three operational amplifiers 40, 41 and 42, suitably of the type CLC11AJE, using positive and negative five volt biasing supplies and a chain of R-C networks. Resistors R1 through R5, each 100 ohms, capacitor C1 of 270 PF, C2 and C3 are 100 PF and C5 and C6 are 330 PF.

A more detailed schematic of a preferred form of pulse generator 19 is illustrated in FIG. 6. The unit comprises a resettable SR type flip flop 45, a D type flip flop 46 and a two input Nor gate 47 which are connected as illustrated. As is standard the R input of the D type flip flop is connected to ground, the electrical common. Input 1 serves to receive the leading edge pulse (LEP pulse) containing the leading edge marker earlier described. Input 2 serves to receive the trailing edge pulse (TEP pulse) containing the trailing edge marker earlier described. The foregoing logic elements are preferably implemented using a programmable logic array, such the logical arrays marketed by the Altera company.

In operation, the positive LEP pulse is applied to the S input of SR flip flop 45. In response the flip flop sets its output high. The SR flip flop output remains in that state until the TEP pulse is applied to the R or reset input, which occurs later. The high output of SR flip flop is applied to the D input of D type flip flop 46. The latter flip flop does not change its output to high until a positive going voltage transition is presented at its clock input. Such positive going transition occurs when the Nor gate 47 reverts to its high output state at the conclusion or "trailing edge" of the LEP pulse as hereafter described.

A Nor gate changes its output in inverse relation to a voltage applied at its input. The Nor gate changes its output only when one of the LEP or TEP pulses are present, and as the preceeding description explained, those pulses are generated one at a time. Both the LEP and the TEP pulses, as previously illustrated in FIG. 2, are positive pulses. Hence, for each of the LEP and TEP pulses, the output of Nor gate 47 produces a negative pulse, which is applied to the clock input of a positive edge triggered D type flip-flop.

Since the D type flip flop triggers on the positive transition edge of a pulse applied to that input, and since the pulse produced by the Nor gate is a negative pulse, the positive going pulse edge, which is the transition from a low voltage to a high voltage, occurs at the back end, that is, the trailing edge of the negative pulse. The D type flip flop switches its output high, and, as is characteristic of this kind of flip flop, retains that output state until it receives the next clock pulse, particularly the positive going edge of the clock pulse, irrespective of any changes in voltage at its D input. That clock pulse is provided indirectly by the TEP pulse.

The TEP pulse is received at input 2 to this circuit and is applied to an input of the Nor gate and to the reset input of the SR flip flop. The SR flip flop resets to await the next LEP pulse. And Nor gate 47 produces a negative pulse, which is the inverse of the TEP pulse. When the negative pulse concludes with a positive going voltage at the pulse's back end or trailing edge, D type flip flop 46 resets and its output returns from the then existing high to a low. Essentially, the output of the D type flip flop is a positive pulse whose leading edge is determined by the trailing edge of the LEP pulse and whose trailing edge is determined by the trailing edge of the TEP pulse.

Even though the pulses inputted to the novel pulse detection circuit may have varied between one another in amplitude, the pulse output from the STD video circuit are of fixed amplitude. In width, the pulse so reproduced is an exact clone of the pulse generator that generated the pulses. Further, because the pulse is an exact clone and because the time measurement is of one nanosecond accuracy or better, very slight differences in pulse width are detectable, a feature which can be used to advantage to identify different sources of radar emissions.

It is appreciated that pulse generator 19 is unnecessary to leading edge detection. It is an added feature that allows the pulse detector to perform additional functions. As example, different radar sets employ oscillators to generate radar pulses and the oscillator in one radar set differs slightly in frequency from the corresponding oscillator in another radar set, although both oscillators are nominally tuned to the same frequency. By listening to different radar sets, including those on identified military aircraft, one may produce a catalogue of frequencies or pulse widths for each such radar. When latter listening and examining emissions, by checking the detected pulse width against the catalogue, one is able to identify the radar set or the craft on which that radar set is employed. This technique is generically similar to that used to identify different submarines by listening for characteristic acoustic sounds emitted by the submarine's engines.

Figure 7:
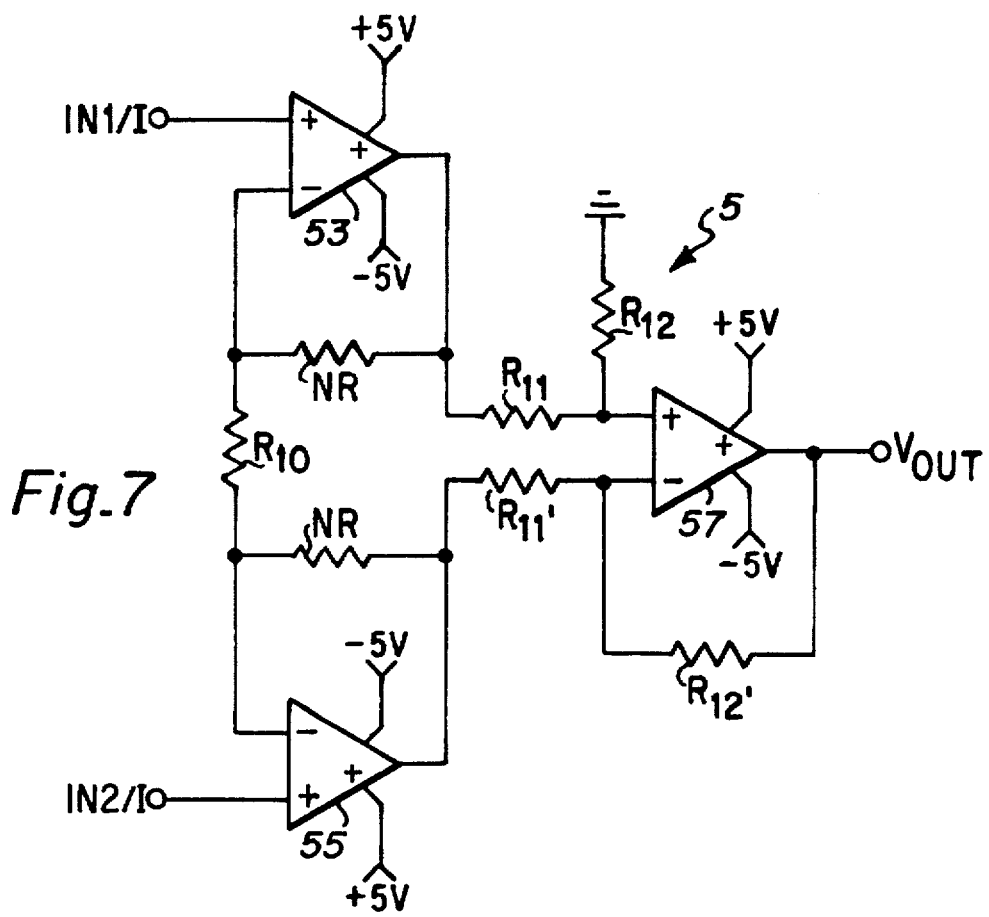
FIG. 7 is a schematic of one type of summing amplifier as may be used for the summing amplifier in the embodiment of FIG. 1.

One known form of difference amplifier preferred for use in the embodiment of FIG. 1 as difference amplifiers 5 and 7 is schematically illustrated in greater detail in FIG. 7, to which reference is made, and is described at some length in the book "Intuitive IC OP Amps", Thomas M. Frederiksen, published as part of the National's Semiconductor Technology Series, National Semiconductor Company (pages 176–178).

The amplifier uses three operational amplifiers 53, 55 and 57, suitably type CLC400, and resistors NR, R10, R11, R12, R11', and R12' connected as illustrated. It may be shown that the output voltage of this circuit, Vout, is equal to a factor, (2N+1)(R12/R11), multiplied by the difference in input voltages at IN1 and IN2, when the ratio of R12/R11 equals the ratio (R12'/R11'). The foregoing difference amplifier is a standard circuit found in the described and other technical literature and is familiar to those knowledgeable in analog circuitry as an instrumentation amplifier.

Figure 8:
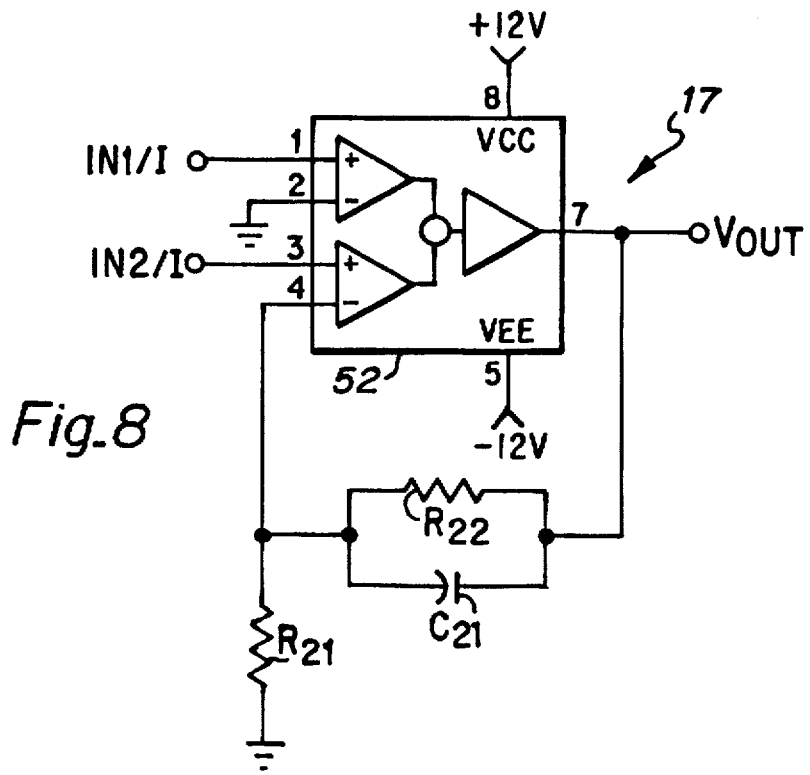
FIG. 8 is a schematic of a type of difference amplifier as may be used for the difference amplifier appearing in the embodiment of FIG. 1.

One form of summing circuit for use in the embodiment of FIG. 1 as summer 17 is illustrated in FIG. 8. Such summing circuits are also described in the earlier cited book "Intuitive IC OP Amps", Thomas M. Frederiksen, at page 176. As shown this particular design employs an operational amplifier type summing chip 52, suitably type AD830JR, connected as illustrated, with the output shunted by an R-C circuit formed by a small resistor R22, suitably 432 ohms, and capacitor C21, suitably 5.6 pf in series with resistance R21, suitably 715 ohms to ground.

One can appreciate the circuits immunity to amplitude change in applied electronic pulses by referring again to FIG. 2f, that illustrates the difference signal, the single cycle AC signal having an initial negative half cycle. When the amplitude of the input pulse increases in amplitude, one can follow through the circuit operation and understand that what occurs is that the amplitude of the difference LEP will increase. This is represented in the figure by the dotted sinusoid. Although increasing in amplitude, the completion time of the initial half cycle of the AC remains the same. As shown the dotted line crosses the axis at the same location as before.

A practical embodiment of the described circuit was tested, for one, by using a pulse generator of known accuracy capable of sub-nanosecond range, suitably 50 picoseconds, applied at the circuit input. The voltage levels of the generator's output was varied manually from 100 millivolts to 3 volts, a 30 to 1 range, while the time measurements were observed on the display. Despite the amplitude changes, it was found that the time measured did not vary. The measurement obtained compared in accuracy to the known time, and was within one nanosecond or less of the known time. This demonstrated the circuit's immunity to a wide dynamic range of pulse amplitude variation. Further, with the pulse generator's amplitude and pulse to pulse time interval constant, the rise time of the pulses was varied, from twenty nanoseconds to one-hundred nanoseconds and each time the determined time measurement noted. In each instance the time measurement was the same. This proved that the circuit was consistent, its measurements reliable, repeatable, and proved relatively immune to changes in pulse rise time.

To applicant's surprise the system of electronic time markers produced in this way is remarkably consistent and achieves a degree of accuracy never before achieved. The transformations of the input pulse voltage appears to liberate detection of the pulse's leading edge from the vagaries inherent in keying a marker to the leading edge's voltage level by the use of threshold detectors or differentiators found in the prior devices. Although the received pulse's voltage level may vary in wide amounts from one pulse to the next, as would cause a shift in position in a timing marker generated through conventional threshold voltage detection and consequent inaccuracy, the present circuit is unaffected and essentially immune. Capable of providing timing markers over a wide dynamic range of pulse voltages and shapes, the present pulse edge detector is found by testing to be within one nanosecond in accuracy. The accuracy attained through the present invention represents an improvement in accuracy that is at least thirty times more accurate than other systems known to the applicant.

The unique circuit appears to have removed detection of pulse edge detection from the voltage domain and shifted detection instead to the time domain. It is believed that a mathematical proof may some day be found by other researchers to justify the foregoing belief and allow a mathematical calculation of the degree of accuracy of which the disclosed circuit is capable of obtaining.

The foregoing embodiment of the invention was described in connection with square wave pulses. However, as is apparent to those skilled in the art upon reading this specification, the invention is also applicable to pulses of other waveshapes. Moreover, given a pulse waveform that differs dramatically from the rectangular, it may be desirable to adjust the component values in the complementary high pass filter and/or low pass filter to obtain a transformed waveform that corresponds to the prescribed waveforms given in the preceding description.

Further, those skilled in the art recognize that complementary high pass filter 1 and low pass filter 3, as described, allow a band of frequencies to pass and in a sense the combination of the two filters may be said to function as a band pass filter. It is appreciated, thus, that if a band pass filter of conventional structure is found that is determined to be equivalent in all respects and satisfies the described functional conditions for use it may be substituted for the two filters as desired.

The foregoing pulse detector has been described in connection with radar systems and time measurement application. Other applications are apparent to those skilled in the art. As example, the foregoing circuit may be used to upgrade a low quality pulse generator. The circuit may be incorporated within a pulse generator whose amplitude might vary, due to temperature changes or other factors. By using the disclosed circuits to convert the generated pulses to pulses of fixed amplitude and identical pulse width, the pulse generator may be improved at relative little increase in expense and/or complexity.

The smoothly rounded waveform resembles the Gaussian curve familiar in mathematics and engineering and, although not identical with such Gaussian curve, may nonetheless for purposes of this specification and claims may be referred to in shape as Gaussian-like or simply Gaussian, and the reference is understood to have the foregoing meaning. Likewise the time varying signal derived from the Gaussian shaped waveform in the manner described is seen as an alternating current type waveform and is referred to as an AC waveform and sometimes as sinusoidal in shape.

It is believed that the foregoing description of the preferred embodiments of the invention is sufficient in detail to enable one skilled in the art to make and use the invention. However, it is expressly understood that the detail of the elements presented for the foregoing purpose is not intended to limit the scope of the invention, in as much as equivalents to those elements and other modifications thereof, all of which come within the scope of the invention, will become apparent to those skilled in the art upon reading this specification. Thus the invention is to be broadly construed within the full scope of the appended claims.

What is claimed is:

1. An electronic pulse edge detector, comprising:

buffer means for inputting electronic pulses, said pulses having a leading edge and a trailing edge;

complementary high pass filter means for receiving electronic pulses from said buffer means and outputting a low frequency filtered pulse;

low pass filter means for receiving said low frequency filtered pulse and further filtering said pulse of high frequencies to output a first signal having a positive Gaussian like waveform, associated with said leading edge, followed an interval thereafter by a negative Gaussian like waveform, associated with said trailing edge;

branch circuit means containing an input, a first branch, and a second branch; said first branch including a time delay means for delaying output from said first branch relative to output from said second branch for a predetermined short time interval less than the duration of either of said positive and negative Gaussian like waveforms;

said branch circuit means for receiving said first signal and producing a delayed copy of said first signal at an output of said first branch and reproducing said first signal at an output of said second branch;

first difference amplifier means having a positive input, a negative input and an output for producing at said output a signal equal to the difference between voltage applied to said negative input and that applied to said positive input;

said first difference amplifier means for subtracting said first signal from the delayed copy of said first signal to generate a difference signal comprising a single cycle AC signal having an initial half cycle of one polarity, associated with said leading edge, followed an interval thereafter by another single cycle AC signal, associated with said trailing edge, having an initial half cycle of a second polarity;

second difference amplifier means having a positive input, a negative input and an output for producing at said output a signal equal to the difference between voltage applied to said negative input and that applied to said positive input;

said second difference amplifier means for subtracting said delayed copy of the third signal from said signal to generate a second difference signal comprising a single cycle AC signal, associated with said leading edge, having an initial half cycle of said second polarity followed an interval thereafter by another single cycle AC signal, associated with said trailing edge, having an initial half cycle of said first polarity;

first comparator means, having first and second inputs, a gate input and an output, said comparator means providing a comparison of a voltage applied to said first input with any voltage applied to a second input and providing a high output voltage during any period when the latter voltage is greater than the former voltage, unless inhibited by an inhibit voltage applied to said gate input, and during other periods providing a low output voltage;

second comparator means, having first and second inputs, a gate input and an output, said second comparator means providing a comparison of a voltage applied to said first input with any voltage applied to a second input and providing a high output voltage during any period when the latter voltage is greater than the former voltage, unless inhibited by an inhibit voltage at said gate input, and otherwise providing a low voltage output;

bias means for biasing said second input of said first comparator means and said second input of said second comparator means at essentially zero volts;

said first comparator means for receiving said output of said first difference amplifier means at said first input and said bias voltage at said second input for commencing generation of a High output when the former is less in voltage than the latter and continuing said High output, during absence of an inhibit voltage at said respective gate, until said first difference amplifier output attains essentially zero volts, and thereupon reverting to a low voltage output, whereby said first comparator means detects completion of said initial half cycle of said AC signal and generates an output pulse having a trailing edge that marks termination of said initial half cycle of AC;

said second comparator means for receiving said output of said second difference amplifier means at said first input and said bias voltage at said second input for commencing generation of a High output when the former is less in voltage than the latter and continuing said High output, during absence of an inhibit voltage at said respective gate, until said second difference amplifier output attains essentially zero volts, and thereupon reverting to a low voltage output, whereby said second comparator means detects the termination of said initial half cycle of AC and generates an output pulse having a trailing edge that marks termination of said initial half cycle of AC;

summing amplifier means having first and second inputs for producing an output voltage representing the sum of the voltages applied at each of said first and second inputs;

said summing amplifier means for adding together said first signal from said first branch output with said delayed copy of said first signal from said second branch output and providing a sum signal at an output, said sum signal comprising a positive Gaussian waveform of said first polarity followed an interval thereafter by a negative Gaussian waveform of said second polarity to define first and second time windows;

third comparator means, having an sense input, a bias input and an output for producing an inhibit voltage output only when the voltage at said sense input is less than the voltage at said bias input;

said third comparator means having said sense input connected to the output of said summing circuit means to receive said positive and negative Gaussian sum waveforms, and having said output coupled to said gate of said first comparator means, whereby said third comparator means terminates said inhibit voltage only during said positive Gaussian sum waveform;

inverting amplifier means coupled to the output of said summing circuit means for inverting the polarity of said summing circuit output, whereby said positive Gaussian sum signal is converted to a negative Gaussian sum signal and said negative Gaussian sum signal is converted to a positive Gaussian sum signal;

fourth comparator means having an sense input, a bias input and an output for producing an inhibit voltage output only when the voltage at said sense input is less than the voltage at said bias input; and said fourth comparator means having said sense input coupled to the output of said inverting amplifier means to receive said inverted positive and negative Gaussian sum signals and having said output coupled to said gate of said second comparator means, whereby said fourth comparator means terminates said inhibit voltage only during said inverted negative Gaussian sum waveform.

2. A method of measuring time between electronic pulses in an electronic pulse train, including a pulse and the next following pulse, said pulses containing a leading edge of a finite duration which includes the steps of:

(a) transforming the leading edge waveform of each pulse in said pulse train to a respective Gaussian like waveform, said Gaussian like waveform being of a duration substantially greater duration than the duration of the respective pulse's leading edge;

(b) applying said Gaussian-like waveform to first and second propagation paths and delaying the propagation of said Gaussian-like waveform through said first propagation path by a predetermined short time interval, said predetermined short time interval being substantially less in duration than the duration of said Gaussian-like waveform, whereby said Gaussian-like waveform propagates along each propagation path to a respective path output with the output of one path being slightly delayed in time from the other path and with said outputs being substantially overlapping;

(c) subtracting said Gaussian-like waveform output from one branch from said delayed Gaussian-like waveform of the remaining branch to derive therefrom an AC waveform of one cycle duration having an initial half cycle of one polarity and a remaining half cycle of a second polarity, said AC waveform being of a greater duration than said duration of said Gaussian-like waveform;

(d) generating a first marker signal when said initial half cycle of said AC waveform cycles through zero upon the completion of a first half cycle to represent a leading edge for said pulse;

(e) repeating foregoing steps (a) through (c) upon said next following pulse in said pulse stream to derive therefrom another AC waveform of one cycle duration;

(f) generating a second marker signal when said another AC waveform cycles through zero upon the completion of a first half cycle to represent a leading edge for said next following pulse; and (g) measuring the difference in time between the occurrence of said first and second marker signals.

3. A pulse edge detector for detecting and representing edges of electronic pulses, said pulses having a leading edge and a trailing edge, comprising:

input means for receiving a train of electronic pulses;

first means, coupled to said input means, for producing at an output a positive Gaussian like waveform, in response to a leading edge of each inputted pulse, said positive Gaussian like waveform having a duration greater than the duration of said leading edge of said pulse, and thereafter producing at said output a negative Gaussian like waveform in response to the trailing edge of said pulse, said negative Gaussian like waveform having a duration greater than the duration of said trailing edge of said pulse;

second means, coupled to said first means, responsive to said positive Gaussian like waveform, for producing in time overlapping time relationship with said respective positive Gaussian like waveform a sinusoidal like time varying waveform of one cycle in duration, said sinusoidal like time varying waveform cycling through zero volts in partially overlapping time relationship with said positive Gaussian like waveform, whereby at the end of a first half of said cycle said sinusoidal like waveform is at a level of zero volts, while said positive Gaussian like waveform is at that same instant at a voltage level other than zero volts; and first detecting means for generating a time marker signal to represent said leading edge of said respective inputted pulse, responsive to the completion of said first half cycle of said first sinusoidal like waveform.

4. The invention as defined in claim 3, further comprising:

third means, coupled to said first means, responsive to said negative Gaussian like waveform, for producing in partially overlapping time relationship with said negative Gaussian like waveform a fourth signal having a sinusoidal like time varying waveform of one cycle in duration, said sinusoidal like time varying waveform cycling through zero volts in overlapping time relationship with said negative Gaussian like waveform, whereby at the end of a first half of said cycle said sinusoidal like wave form is at a voltage of zero volts, while said negative Gaussian like waveform is at that same instant at a voltage other than zero volts; and second detecting means for generating a time marker signal to represent said trailing edge of said respective inputted pulse, responsive to the completion of said first half cycle of said second sinusoidal like waveform.

5. The invention as defined in claim 4, wherein said first circuit means comprises:
   complementary high pass filter means; and
   low pass filter means;
   said complementary high pass filter means and said low pass filter means being connected in series.

6. The invention as defined in claim 5, wherein said complementary high pass filter means further comprises: a delay line.

7. The invention as defined in claim 3, wherein said first means includes:
   branching circuit means having first and second branches, said branching circuit means having an input connected to said output of said low pass filter to provide parallel propagation paths to outputs at said respective first and second branches for signals applied to said input, said second branch including delay circuit means for delaying propagation of signals propagating through said second branch for a predetermined interval, whereby two signals having like waveforms is obtained at outputs of said first and second branches, each signal containing a positive Gaussian portion and one of which signals is delayed slightly relative to the other; and
   wherein said second means includes:
   first difference means having first and second inputs for subtracting an output from one of said first and second branches from the other to produce a difference waveform; said difference waveform defining a sinusoidally varying signal of one cycle that contains an initial half cycle of a first polarity and a remaining half cycle of a second polarity.

8. The invention as defined in claim 7, wherein said first detecting means comprises:
   comparator means; said comparator means having first and second inputs, an enabling gate and an output; said first input being coupled to said output of said first difference means and said second input being biased at approximately zero volts; said comparator means providing a first High output when a voltage at said first input is less than the voltage at said second input during the presence of an enabling voltage at said enabling gate, and providing a Low output during any period in which said said input voltage is equal to or greater than the voltage at said second input or in the absence of an enabling voltage at said enabling gate; and, further comprising:
   enabling means for providing an enabling voltage to said enabling gate only when the sum of voltages at the outputs of said first and second branches of said branching means exceeds a predetermined level; said enabling means further comprising:
      summing amplifier means having a pair of inputs coupled to outputs of said first and second branches of said branching means and an output for producing a voltage at said output that is the sum of voltages applied at said inputs; and
      second comparator means; said second comparator means having first and second inputs and an output; said first input being coupled to said output of said summing amplifier means and said second input being set to a predetermined bias voltage;
      said output of said second comparator means being coupled to said enabling gate of said first comparator means for applying an enabling voltage to said enabling gate during any period said sum voltage exceeds said bias voltage at said second input.

9. A pulse generator comprising:
   generator means for generating an electronic pulse train, comprising a serial string of pulses, each having a leading edge and a trailing edge;
   first means, coupled to said generator means, for producing at an output a positive Gaussian like waveform, in response to a leading edge of each inputted pulse, said positive Gaussian like waveform having a duration greater than the duration of said leading edge of said pulse, and thereafter producing at said output a negative Gaussian like waveform in response to the trailing edge of said pulse, said negative Gaussian like waveform having a duration greater than the duration of said trailing edge of said pulse;
   second means, coupled to said first means, responsive to said positive Gaussian like waveform, for producing in time overlapping time relationship with said respective positive Gaussian like waveform a sinusoidal like time varying waveform of one cycle in duration, said sinusoidal like time varying waveform cycling through zero volts in partially overlapping time relationship with said positive Gaussian like waveform, whereby at the end of a first half of said cycle said sinusoidal like waveform is at a level of zero volts, while said positive Gaussian like waveform is at that same instant at a voltage level other than zero volts;
   first detecting means for generating a time marker signal to represent said leading edge of said respective inputted pulse, responsive to the completion of said first half cycle of said first sinusoidal like waveform;
   third means, coupled to said first means, responsive to said negative Gaussian like waveform, for producing in partially overlapping time relationship with said negative Gaussian like waveform a fourth signal having a sinusoidal like time varying waveform of one cycle in duration, said sinusoidal like time varying waveform cycling through zero volts in overlapping time relationship with said negative Gaussian like waveform, whereby at the end of a first half of said cycle said sinusoidal like wave form is at a voltage of zero volts, while said negative Gaussian like waveform is at that same instant at a voltage other than zero volts;
   second detecting means for generating a time marker signal to represent said trailing edge of said respective inputted pulse, responsive to the completion of said first half cycle of said second sinusoidal like waveform; and
   switching means for providing a pulse output, said switching means being coupled to said first detecting means for commencing a pulse responsive to said first marker signal and being coupled to said second detecting means for terminating each said pulse responsive to said second marker signal.

10. Electronic apparatus for detecting an edge of applied electronic pulses, each of said electronic pulses including an edge, comprising:
   first means for transforming said pulse edge to a time varying AC signal of a single AC cycle in which said single AC cycle includes an initial half cycle of a first polarity followed by a remaining half cycle of a second polarity; and
   second means for detecting and signaling the completion of said initial half cycle to represent said pulse edge.

11. The invention as defined in claim 10 wherein said edge included in each said electronic pulses comprises a leading edge and, following said leading edge in time, a trailing edge;

and wherein said first means includes:

first transformation means for transforming said leading edge to a first time varying AC signal of a single AC cycle in which said single AC cycle includes an initial half cycle of a first polarity followed by a remaining half cycle of a second polarity and for transforming said trailing edge to a second time varying AC signal of a single AC cycle in which said single AC cycle includes an initial half cycle of said second polarity followed by a remaining half cycle of said first polarity; and wherein said second means further comprises: leading edge signaling means for signaling the completion of said initial half cycle of said first time varying AC signal.

12. The invention as defined in claim 11, wherein said second means further comprises:

trailing edge signaling means for signaling the completion of said initial half cycle of said second time varying AC signal.

13. The invention as defined in claim 12, further comprising:

pulse generating means responsive to said leading edge signaling means for commencing generation of a pulse and responsive to said trailing edge signaling means for terminating the pulse so commenced, whereby said pulse generating means generates a new pulse that contains a pulse width essentially equal to the pulse width of said electronic pulse.

14. The invention as defined in claim 11, wherein said first means includes:

first circuit means for producing at an output a first signal having a positive Gaussian like waveform, in response to a leading edge of said inputted electronic pulse, said positive Gaussian like waveform having a duration greater than the duration of said leading edge of said electronic pulse, and, thereafter, producing at said output a second signal having a negative Gaussian like waveform in response to the trailing edge of said electronic pulse, said negative Gaussian like waveform having a duration greater than the duration of said trailing edge of said electronic pulse.

15. The invention as defined in claim 14, wherein said first means further comprises:

second circuit means, coupled to said output of said first circuit means, for producing a delayed copy of said first signal that substantially overlaps in time said first signal; said delayed copy being delayed by a predetermined interval with said predetermined interval being less than half said duration of said positive Gaussian like waveform.

16. The invention as defined in claim 15, wherein said second circuit means comprises:

branching circuit means having first and second branches; said branching means having an input connected to said output of said first circuit means to provide parallel propagation paths for said first signal applied to said input at outputs to said respective first and second branches;

said second branch including time delay means for delaying propagation of signals propagating through said second branch for a predetermined interval, whereby a pair of like waveforms is obtained at said two outputs of said branching circuit means, each containing a positive Gaussian waveform portion, and in which one of said waveforms is delayed slightly relative to the other.

17. The invention as defined in claim 15, wherein said first means further comprises:

subtraction means for subtracting one of said first signal and said second signal from the other to produce at an output a time varying AC signal of a single AC cycle in which said single AC cycle includes an initial half cycle of a one polarity followed by a remaining half cycle of an opposite polarity.

18. The invention as defined in claim 17, wherein said subtraction means comprises:

first subtraction means for subtracting said first signal from said second signal to produce at an output a difference signal, said difference signal including a first time varying AC signal of a single AC cycle in which said single AC cycle includes an initial half cycle of a first polarity followed by a remaining half cycle of a second polarity and, following said first signal, a second time varying AC signal of a single AC cycle in which said single AC cycle includes an initial half cycle of said second polarity followed by a remaining half cycle of said first polarity; and second subtraction means for subtracting said second signal from said first signal to produce at an output a second difference signal, said second difference signal including a first time varying AC signal of a single AC cycle in which said single AC cycle includes an initial half cycle of said second polarity followed by a remaining half cycle of said first polarity and, following said first signal, a second time varying AC signal of a single AC cycle in which said single AC cycle includes an initial half cycle of said first polarity followed by a remaining half cycle of said second polarity.

19. The invention as defined in claim 14 wherein said first circuit means further comprises:

complementary high pass filter means; and low pass filter means;

said complementary high pass filter means and said low pass filter means being connected in series.

20. The invention as defined in claim 19, wherein said complementary high pass filter means includes a first predetermined bandwidth; and wherein said low pass filter means comprises a second predetermined bandwidth; and wherein said first predetermined bandwidth is substantially larger than said second predetermined bandwidth.

21. The invention as defined in claim 15, wherein said leading edge detection means further comprises:

first comparator means having first and second inputs, a control gate, and an output; bias means for biasing said second input at a voltage equal to the level of voltage at which said first signal completes said initial half cycle;

summing means for producing a gating signal and applying said gating signal to said control gate during the presence of both said first time varying AC signal and said delayed copy of said first time varying AC signal to define a first enablement time window for said first comparator means;

said first comparator means for receiving said first signal at said first input and commencing generation of a pulse responsive to presence of said initial cycle of said first time varying AC signal at said first input and concluding said generated upon completion of said initial cycle, whereby said generated pulse contains a trailing edge that marks said leading edge of said applied electronic pulse.

22. The invention as defined in claim 21, wherein said trailing edge detection means further comprises:

second comparator means having first and second inputs, a control gate, and an output; bias means for biasing said second input at a voltage equal to the level of voltage at which said second signal completes said initial half cycle;

and wherein said summing means includes means for producing a gating signal and applying said gating signal to said control gate of said second comparator means during the presence of both said second time varying AC signal and said delayed copy of said second time varying AC signal to define a second enablement time window for said second comparator means;

said second comparator means for receiving said second time varying AC signal at said first input and commencing generation of a pulse responsive to presence of the initial cycle of said second time varying AC signal at said first input and terminating said generated pulse upon completion of said initial cycle of said second time varying AC signal, whereby said generated pulse contains a trailing edge that marks said trailing edge of said applied electronic pulse.

23. The invention as defined in claim 14, further comprising:

second circuit means, coupled to said first circuit means, responsive to said positive Gaussian like waveform, for producing in overlapping time relationship with said respective positive Gaussian like waveform a third signal having a sinusoidal like time varying waveform of one cycle in duration, said sinusoidal like time varying waveform cycling through zero volts in overlapping time relationship with said positive Gaussian like waveform, whereby, at the end of a first half of said cycle, said sinusoidal like waveform is at a level of zero volts, while said positive Gaussian like waveform is at that same instant at a voltage level other than zero volts.

24. The invention as defined in claim 10, wherein said first means includes:

first circuit means for producing at an output a first signal having a positive Gaussian like waveform, in response to a leading edge of said inputted electronic pulse, said positive Gaussian like waveform having a duration greater than the duration of said leading edge of said electronic pulse, and, thereafter, producing at said output a second signal having a negative Gaussian like waveform in response to the trailing edge of said electronic pulse, said negative Gaussian like waveform having a duration greater than the duration of said trailing edge of said electronic pulse.

* * * * *